United States Patent Office 3,395,888
Patented Aug. 6, 1968

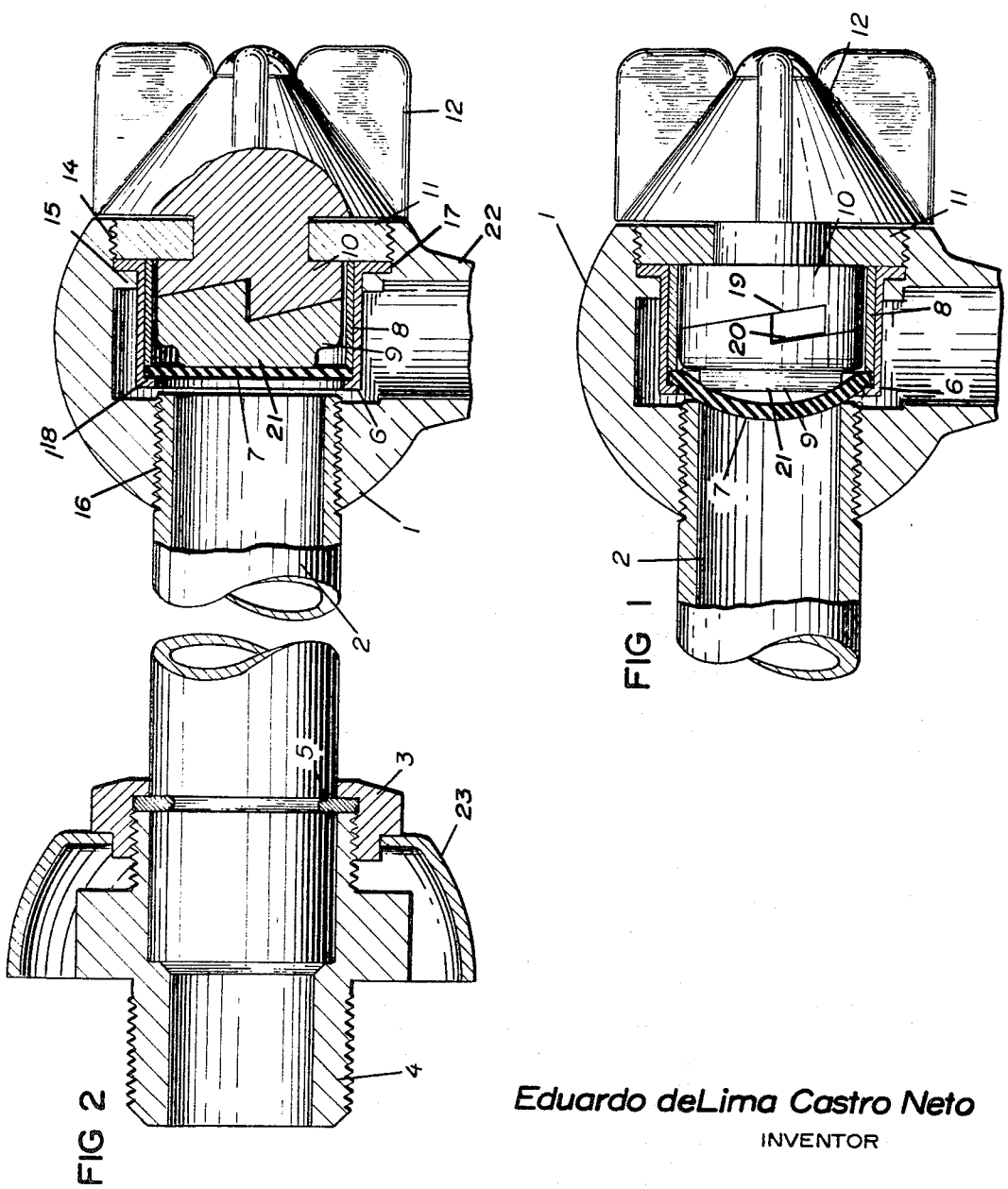
Eduardo deLima Castro Neto
INVENTOR

3,395,888
TAP AND REGISTER
Eduardo de Lima Castro Neto, Estrada do Timbo 63,
Rio de Janeiro, Brazil
Filed Apr. 13, 1965, Ser. No. 447,641
Claims priority, application Brazil, Apr. 13, 1964,
158,379
1 Claim. (Cl. 251—256)

This invention relates to an improved tap and register.

An object of the invention is to eliminate the numerous manufacturing operations at present required.

A further object is to provide a tap and register which will eliminate the present procedure of manufacturing at least three different sizes such as large, medium and small.

A further object of the invention is to provide means whereby one end of the tap pipe may be adjusted to the main pipe line without the necessity of screwing it thereto.

With the above and other objects in view, a preferred embodiment of the invention is shown in the drawings wherein:

FIGURE 1 is a cross-sectional view of a tap with parts shown in elevation illustrating the tap in closed position and FIGURE 2 is a longitudinal cross-sectional view of the tap in open position and the register with the main pipe with parts in elevation.

Referring to the drawings, the tap comprises a hollow rounded body 1 having at its interior portion a threaded aperture which is screwed upon one threaded end of the pipe 2. The other end of the pipe 2 as shown in FIGURE 2 is unthreaded so that it may be introduced and fixed into the junction with the main pipe line.

The junction comprises three elements. The first is a tubular member 4 provided with threads at both ends and containing a center groove for the unthreaded end of the pipe 2. Located between the tubular element 4 and a groove in the pipe 2 is a conical nut 5 which is secured to the element 4 by a nut 3. The nut 3 causes the nut 5 to assume a flat shape.

The body 1 of the tap is a hollow rounded element having attached thereto the tap itself which may be slightly conical in configuration.

The central cavity of the tap body 1 is provided with an enlarged opening towards the front having the interior threads 14. It is also provided with an annular shoulder 15. At the rear of the cavity in the body 1 there are provided the interior threads 16 which engage the threads upon the pipe 2. Within the central cavity there is positioned a cylindrical element 6 having an exterior flange 17 at the forward end engaging the shoulder 15 and at the rear end an inwardly projecting annular flange 18 which engages the rubber disc diaphragm 7 at its perimeter. Within the element 6 is located a cylindrical sleeve 8 which engages at its rear end the disc 7 and clamps it against the flange 18. The elements 6 and 8 are maintained in position within the cavity by the threaded disc 11 which is mounted upon the element 10 of the tap. The element 10 which is held in position by the disc 11 extends forwardly and has secured thereto an operating knob 12. The forward end of the element 10 is provided with the cam surfaces 19 and these surfaces preferably two in number, cooperate with the cam surfaces 20 provided upon the forward face of the element 9. The rearward face of the element 9 is reduced in diameter so as to provide a central projection 21 which bears against the central portion of the disc 7. The operation of the tap is as follows: when the knob 12 is rotated, this brings about a rotation of the element 10 so that the cam surfaces 19 and 20 move from the position shown in FIGURE 1 which is the closed position to the position shown in FIGURE 2 which is the opened position. The central extension 21 of the element 9 is thereby withdrawn forwardly and water may pass from the pipe 2 through the spigot 22 shown partially in the figures.

The conical nut 5 in the junction is preferably a conical steel washer which when forced by the nut 3 assumes a flat shape as shown in FIGURE 2. The element 23 is a cover plate held in position also by the nut 3.

What I claim is:

1. A tap comprising a body having a longitudinally extending cavity therein, said cavity having an enlarged forward portion and a smaller rear portion, a supply pipe having two terminals fixed to said rear portion, a flexible disc fixed at its periphery in said forward portion adjacent said rear portion and one of said terminals of said pipe, a spigot on said body extending transversely to said cavity, a cam element slidably mounted in said forward portion cooperating with said disc at its central portion to open and close said supply pipe, manually operated cam means cooperating with said cam element to move said disc to closed position, said spigot having communication with said supply pipe when said disc is in open position spaced from said supply pipe, said flexible disc is rubber and is secured in position adjacent said rear body portion by two telescopically cooperating cylinders each cylinder being radially spaced from said forward body portion to provide a flow path around the outer cylinder.

References Cited

UNITED STATES PATENTS

| 460,728   | 10/1891 | Sandlass | 251—252 |
| 1,762,771 | 6/1930  | Eble     | 251—148 |
| 2,497,557 | 2/1950  | Reeves   | 251—331 X |
| 2,999,701 | 9/1961  | Blair    | 285—340 |

FOREIGN PATENTS 303,023 11/1932 Italy.

ARNOLD ROSENTHAL, *Primary Examiner.*

J. W. KNIGHT, *Assistant Examiner.*